June 1, 1948.   F. A. KROHM   2,442,697
DRIVE MOUNTING FOR WINDSHIELD WIPER ARMS
Filed March 23, 1944
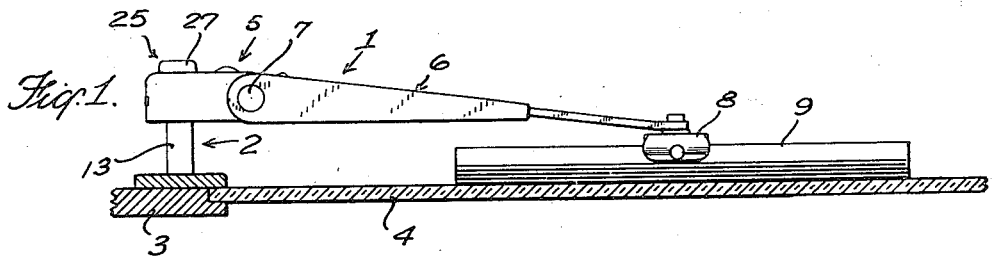
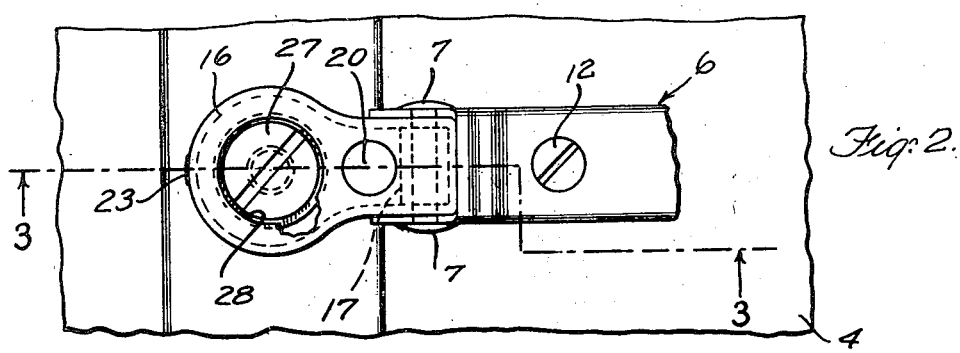
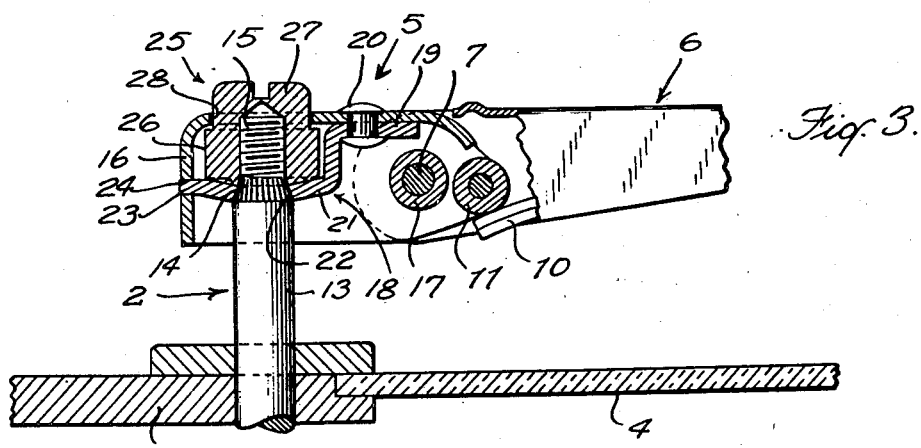
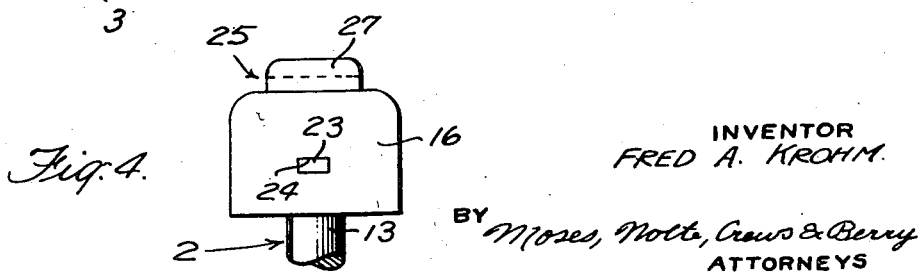
INVENTOR
FRED A. KROHM.
BY Moses, Nolte, Crews & Berry
ATTORNEYS Patented June 1, 1948

2,442,697

UNITED STATES PATENT OFFICE 2,442,697

DRIVE MOUNTING FOR WINDSHIELD WIPER ARMS

Fred A. Krohm, Gary, Ind., assignor to Productive Inventions, Inc., a corporation of Indiana Application March 23, 1944, Serial No. 527,723

13 Claims. (Cl. 287—53)

1

This invention relates to windshield wiper arms and more particularly to the mounting of windshield wiper arms on operating shafts.

The invention has to do particularly with a type of wiper arm mounting in which a portion of the inner wiper arm section is operatively engaged by a portion of the shaft, and in which this engagement is maintained by means of a threaded clamping member screwed onto a threaded portion of the shaft.

A popular form of wiper motor, for example, includes a shaft having a beveled shoulder provided with fine radial teeth and a reduced threaded end portion adjacent the shoulder. The innermost section of the wiper arm is adapted to be impaled upon the shaft in engagement with the toothed shoulder, and a separate nut is employed, threadable onto the threaded portion of the shaft, for clamping the inner wiper arm section in secure driving engagement with the teeth of the beveled shoulder.

For effecting this kind of installation, the operator really requires three hands, one for holding the wiper arm, one for holding the nut, and one for holding a tool for turning the nut. The operation of applying a wiper arm to this kind of shaft has been a very awkward and time consuming one. This has been particularly true for the reason that if the arm is not placed exactly in the right position of orientation on the first try, it must be removed from engagement with the toothed shoulder of the shaft and re-set. It is sometimes necessary to repeat this operation more than once in order to get the arm into correct position.

In accordance with the present invention, these difficulties are overcome by securing to the innermost wiper arm section with capacity for rotation relative thereto, a threaded clamping member engageable with the threaded portion of the shaft. The innermost wiper arm section is advantageously made to include a drive transmitting portion directly engageable with the shaft, a housing portion, and a threaded nut having a portion trapped between the drive transmitting and housing portions of the wiper arm section with capacity for rotation relative to them. The nut is desirably formed with a circumferential flange which causes it to be trapped and further includes a head portion which protrudes outwardly through an opening formed in the housing portion of the wiper arm section. This protruding head portion is desirably formed with a screw-driver slot or with some other suitable and desirably conventional formation for engagement by a turning tool.

With the arrangement referred to, threading of the nut upon the shaft forces the drive transmitting member rearwardly and clamps it firmly in interfitting relation with the teeth on the

2 beveled shoulder of the shaft. The drive transmitting member in turn is secured in fixed relation to the housing member, and the housing member in turn carries the remainder of the wiper arm structure.

With the arrangement referred to the nut is held always within the arm section so that in installing the arm the workman simply holds the arm in position with one hand, thereby placing the nut in proper relation to the shaft end, and then applies a power screw-driver with the other hand to turn the nut to applied position.

Another very important feature of the invention has to do with advantages realized when it becomes necessary to remove the arm for resetting to correct the position, or for replacement, or for any other reason after the vehicle has been in service for some time. The mating between the drive transmitting member and the toothed shoulder of the shaft is usually found to be corroded and stuck, so that after the nut is removed from the old type assembly it is often necessary to use tools to pry the head off the shaft. This is bad for the mechanism of the wiper motor, consumes time and labor, and frequently results in defacing the finish of the car adjacent the wiper shaft.

In accordance with the present invention it is only necessary to use a screw-driver and unscrew the nut. As the nut is backed off of the shaft it first relieves its pressure from the drive transmitting member, and next contacts with its shoulder the inside of the housing member, whereupon additional unscrewing of the nut very readily and quickly backs the entire wiper arm off the shaft.

The nut can never be lost, and the assembly is always ready for quick and convenient application to the wiper motor shaft.

When the drum type shaft is used in which a large number of very fine and very shallow serrations are provided to mate with corresponding serrations in the socket of the arm head, the fit has to be so tight that the swelling of the die casting and the corrosion of the mating parts, which corrosion is quite pronounced in the salty air of the seacoast, causes the arm head to freeze quite tight after some period of use and often the arm head is very difficult to remove. The fine serrations are necessary to provide small steps in positioning the arm angularly with relation to the shaft. In order to get this positioning advantage, a critically tight construction must be used.

In accordance with the present invention, the arm may be placed in any one of an infinite number of angular positions with relation to the shaft and the locking operation may be made in less time and with greater convenience than heretofore. This is desirably accomplished in either of two ways. The hole in the drive transmitting member which receives the shaft may be toothed and the member hardened, so as to bite into the shoulder of the shaft, in which event the beveled shoulder on the shaft may desirably be smooth so that the arm will freely take any desired position for locking. Alternatively, the locking member may have a smooth hole to receive the teeth of the beveled shoulder on the shaft, these teeth being hardened so that they will bite into the rim of the hole in the drive transmitting member, at any orientation of the arm head on the shaft. This latter arrangement is the one which is now regarded as most advantageous.

Other objects and advantages will hereinafter appear.

In the drawings forming part of this specification:

Figure 1 is a fragmentary view in side elevation illustrating the windshield wiper which embodies features of the present invention;

Figure 2 is a fragmentary view in front elevation, partly broken away, on a larger scale than Figure 1, illustrating the inner section of the wiper arm of Figure 1, together with certain immediately associated parts;

Figure 3 is a sectional view taken upon the line 3—3 of Figure 2 looking in the direction of the arrows; and Figure 4 is a fragmentary detailed plan view of the inner wiper arm section.

As illustrated in Figure 1, a wiper arm 1 is mounted upon a wiper motor shaft 2 which shaft may desirably be driven by a motor within the vehicle, and may extend through a portion 3 of the vehicle frame adjacent the windshield 4. The windshield wiper desirably comprises an inner section 5 which is made fast upon the shaft 2, and an outer section 6 which is pivotally mounted on the section 5 by means of a cross pin or rivet 7. The wiper arm section 6 carries at the outer end thereof a connector mechanism 8 by which a wiper blade 9 is supported. The wiper arm section 6 desirably includes a spring 10 which bears against a roller 11 carried by the inner section 5 for biasing the section 6 and the wiper blade 9 toward the windshield. The spring structure is desirably like that shown in United States Letters Patent No. 2,326,402, granted to me on August 10, 1943, to which reference may be had for a more complete disclosure. This spring is adjusted to change the bias of the arm toward the windshield by means of a screw 12 in the manner illustrated and described in said patent.

The present invention is concerned altogether with the attachment of the section 5 to the shaft 2 and the removal of said section from the shaft 2.

The shaft 2 comprises, as illustrated, a rear portion 13 of normal diameter, a beveled shouldered portion 14, formed with a multiplicity of fine radial teeth, and a threaded reduced forward end portion 15. The inner section 5 of the wiper arm comprises a body or housing member 16 upon which the wiper arm section 6 is pivotally mounted by means of the rivet 7 and the surrounding sleeve 17. A drive transmitting member 18 is contained within the member 16 and is impaled upon the shaft 2. The member 18 comprises a forward body portion 19 which is disposed in juxtaposed relation to the forward body portion of the member 16 and secured to it by a rivet 20. The member 18 has a rearwardly offset web portion 21 spaced from the forward portion of the member 16 and formed with an opening 22 for receiving the toothed beveled shoulder of the shaft 2. The portion 21 of the member 18 terminates at its upper end in an upwardly extending finger 23 which fits through a hole 24 formed in the member 16.

A nut 25 is adapted to be threaded onto the shaft end 15 for clamping the offset portion 21 of the member 18 into firm interlocking engagement with the toothed shoulder 14. The nut includes a body portion formed with a circumferential flange 26 and a head portion 27. The head portion 27 extends forward through an opening 28 formed in the forward body portion of the housing member 16. The flange portion 26 of the nut, however, is of larger diameter than the opening 28, so that the nut is effectively trapped and detained between the members 16 and 18 but is freely rotatable with relation to said members.

The members 16 and 18, by virtue of the described connections between them, are secured in fixed relation to one another and move always as a unit. The nut 25 has little freedom for axial movement relative to the members 16 and 18. When the nut is turned in either direction relative to the shaft, either to screw the nut onto the shaft or to back it off the shaft, the nut carries the members 16 and 18 along with it.

For example, as the nut is turned to apply the windshield wiper to the shaft, it presses against the portion 21 of the member 18 thrusting it axially along the shaft, and finally forcing it into firm interfitting and interlocking relation with the toothed beveled shoulder 14. When, on the other hand, it is desired to remove the windshield wiper from the shaft, the nut is turned in the opposite direction. The nut first moves to relieve the pressure against the portion 21 of the member 18, but when turned just a little farther it engages the rear wall of the front body portion of the member 16. The member 16 is thus forced by the nut in a forward direction away from the shaft, and carries the member 18 with it, so that the portion 21 of the member 18 is forcibly withdrawn from engagement with the shoulder 14.

The shaft 2 has been described as having teeth formed on its beveled shoulder. These teeth are desirably hardened, and the portion 21 of member 18 is advantageously formed of considerably softer metal so that when the portion 21 is forced rearwardly by the nut 25 the teeth are caused to penetrate the metal of the portion 21 and produce a strong interfitting relationship. If the portion 21 is initially smooth, there is no limitation upon the orientation of the wiper arm relative to the shaft 2, since the teeth can form mating notches in the portion 21 wherever they engage the latter. If preferred, however, the member 21, as well as the shoulder 14, may be initially formed with teeth, the parts being made in that case of complementary construction.

As a further alternative, the shaft may be made with a smooth beveled shoulder, and the portion 21 of member 18 may be formed with hard radial teeth adapted to penetrate the shoulder and to be forced under the action of the nut 25 into interfitting and interlocking relation with the relatively soft metal of the shaft shoulder. It will be understood, of course, in this latter case, that the teeth of the portion 21 will be hardened and that the shaft metal will be made relatively soft and adapted to be penetrated by the teeth.

I have herein described what I believe to be the best embodiments of my invention. I do not wish, however, to be confined to the embodiments shown, but what I desire to cover by Letters Patent is set forth in the appended claims.

What is claimed is:

1. In a windshield wiper arm, a housing having an enlargement and a channel, an inner driving and supporting section arranged therein adapted for securement in direct driven engagement with an operating shaft, said inner section having a head and a radial portion disposed in the enlargement and channel of said housing and a threaded member rotatably mounted on said head portion and adapted for threaded engagement with the shaft.

2. In a windshield wiper arm, an inner driving and supporting section adapted for securement in driven engagement with an operating shaft, said wiper arm section comprising, in combination, a drive transmitting member, a housing member, and a rotatable nut threadable onto the shaft for maintaining the drive transmitting member in operative relation to the shaft, said nut being trapped between the drive transmitting and housing members, said housing member having an opening in axial alignment with the nut through which the nut is made accessible for engagement by a turning tool.

3. In a windshield wiper arm, an inner driving and supporting section adapted for securement in driven engagement with an operating shaft, said wiper arm section comprising, in combination, a drive transmitting member, a housing member, and a rotatable nut threadable onto the shaft for maintaining the drive transmitting member in operative relation to the shaft, said nut including a portion trapped between the drive transmitting and housing members and a head portion which protrudes through the housing member for operative engagement by a turning tool, said head portion engaging a surrounding surface of the housing member for maintaining the axis of the nut in a desired location.

4. In a windshield wiper arm, a housing member provided with a channel, an inner driving and supporting section adapted for securement in driven engagement with a shouldered and threaded shaft, said wiper arm section comprising, in combination, a drive transmitting member disposed in said housing and having a portion secured in the channel, and a rotatable nut threadable onto the shaft for clamping the drive transmitting member in fixed relation to the shoulder on the shaft, said nut including a portion trapped between the drive transmitting and housing members, and a head portion which protrudes through the housing member for operative engagement by a turning tool.

5. In a windshield wiper arm, an inner driving and supporting section adapted for securement in driven engagement with a shouldered and threaded shaft, said wiper arm section comprising, in combination, a housing member which includes a front wall portion, a drive transmitting plate having a first body portion fixed in juxtaposed relation to said front wall portion of the housing member, and a second body portion offset rearwardly therefrom, and a rotatable plate-clamping nut having a portion threadable onto the shaft and trapped between the housing member and said offset body portion, said nut including a portion which extends through the front wall portion of the housing member for operative engagement by a turning tool.

6. In combination, a windshield wiper operating shaft having a beveled shoulder formed with radially extending teeth, and with a reduced threaded end portion adjacent the beveled shoulder, and a wiper arm comprising an inner section which includes a drive transmitting plate impaled on the shaft, a nut threaded on the shaft and clamping the plate in fixed relation to the shaft against said beveled shoulder, and a housing member cooperative with the drive transmitting plate to trap the nut, said housing member having an opening through which the nut is made accessible for the application of a turning tool.

7. A drive shaft provided with cooperating means and a threaded portion, a windshield wiper arm comprising a housing, a drive transmitting member secured to said housing and provided with an aperture receiving the shaft, a rotatable nut trapped between said housing and said member and threadedly connected to said shaft, and said housing having an opening in axial alignment with the aperture and through which the nut is made accessible for engagement by a turning tool whereby the nut may be moved to cause the material defining the aperture in the drive transmitting member in driven relation with the cooperating means on the shaft so that the arm will rotate with the shaft.

8. A drive shaft provided with cooperating means and a threaded portion, a windshield wiper arm comprising a housing, a drive transmitting member secured to said housing and provided with an aperture receiving the shaft, a rotatable nut trapped between said housing and said drive transmitting member and threadedly connected to said shaft, an opening provided in said housing, said nut being provided with a head portion which projects through the opening in the housing for operative engagement by a turning tool, said housing and said nut being provided with engaging portions assisting to maintain the longitudinal axis of said nut in alignment with the axis of said aperture, and said nut when moved in one direction being actable to force the material defining the aperture in said transmitting member into engagement with the cooperating means on the shaft in a manner whereby the arm may rotate with the shaft.

9. In a windshield wiper arm, an inner driving and supporting section adapted for securement in driven engagement with a shouldered and threaded shaft, said wiper arm section comprising, in combination, a housing which includes a front wall portion provided with an opening and a rearwardly extending wall portion, a drive transmitting member having a first body portion fixed in juxtaposed relation to the front wall portion of the housing and a second body portion offset rearwardly therefrom and connected to said rearwardly extending wall portion, and a rotatable clamping nut trapped between the front wall portion of said housing and said drive member and threadable onto the shaft, and said nut including a portion extending through the opening in the front wall portion of said housing for operative engagement by a turning tool.

10. In combination, a windshield wiper operating shaft having a beveled shoulder provided with teeth and with a reduced threaded end portion adjacent the beveled shoulder, and a wiper arm comprising a housing provided with a front wall having an opening therein, and a rearwardly extending wall portion, a drive transmitting member having a transverse portion provided with an aperture receiving the shaft and a portion permanently secured to the front wall of the housing, said drive transmitting member also being provided with a portion cooperating with said rearwardly extending wall portion of said housing in a manner whereby to maintain the transverse portion of the drive member in a predetermined substantially fixed position, and a nut trapped between the front wall of said housing and said transverse portion of said drive member and provided with a portion accessible due to the opening in the front wall of said housing whereby said nut may be moved by a tool in a direction to cause the material defining the aperture in said transverse portion of the drive member to be forced into engagement with the teeth on the shaft so that the housing will rotate with the shaft.

11. In a windshield wiper arm, an inner driving and supporting section adapted for securement in driven engagement with an operating shaft, said wiper arm section comprising, in combination, a housing member having an enlargement and a channel, a drive transmitting member having portions disposed in said enlargement and channel, and a rotatable nut threadable onto the shaft for maintaining the drive transmitting member in operative relation to the shaft, said nut being disposed in said enlargement and trapped between the drive transmitting and housing members, said housing member having an opening in axial alignment with the nut through which the nut is made accessible for engagement by a turning tool.

12. A windshield wiper arm comprising an inner housing section, said section including an enlarged portion and a radial channel portion, drive transmitting means disposed in said housing section, said drive transmitting means including an enlarged portion provided with an aperture for receiving a shaft and a portion secured in the radial channel portion, an opening provided in the enlarged portion of the housing, and a nut trapped in the enlarged portion of the housing by said drive transmitting means so that the axis of the nut and axes of the aperture and opening are substantially in alignment, said nut providing means for securing the drive transmitting means to a shaft when the latter is projected into the aperture, the opening in the enlarged portion of the housing providing means whereby access may be had to the nut so that the latter may be turned by a suitable tool.

13. In a windshield wiper arm subassembly, an inner housing member having an opening, a drive transmitting member secured to said housing member, engaging means carried by said drive transmitting member, and a rotatable nut adapted to threadedly cooperate with a drive shaft for maintaining the engaging means in operative relation to the shaft and having a portion extending through the opening for engagement with a turning tool, said nut being provided with holding means disposed in the housing member of a size to prevent escape of the nut outwardly through said opening.

FRED A. KROHM.

REFERENCES CITED

The following references are of record in the file of this patent:

UNITED STATES PATENTS

| Number | Name | Date |
|---|---|---|
| 761,415 | Sherman | May 31, 1904 |
| 2,193,724 | Horton | Mar. 12, 1940 |
| 2,295,621 | Zaiger | Sept. 15, 1942 |

FOREIGN PATENTS

| Number | Country | Date |
|---|---|---|
| 643,329 | France | May 15, 1928 |